J. H. ELDER.
PRESCRIPTION FILING MACHINE.
APPLICATION FILED AUG. 7, 1917.
1,275,008.
Patented Aug. 6, 1918.
3 SHEETS—SHEET 2.
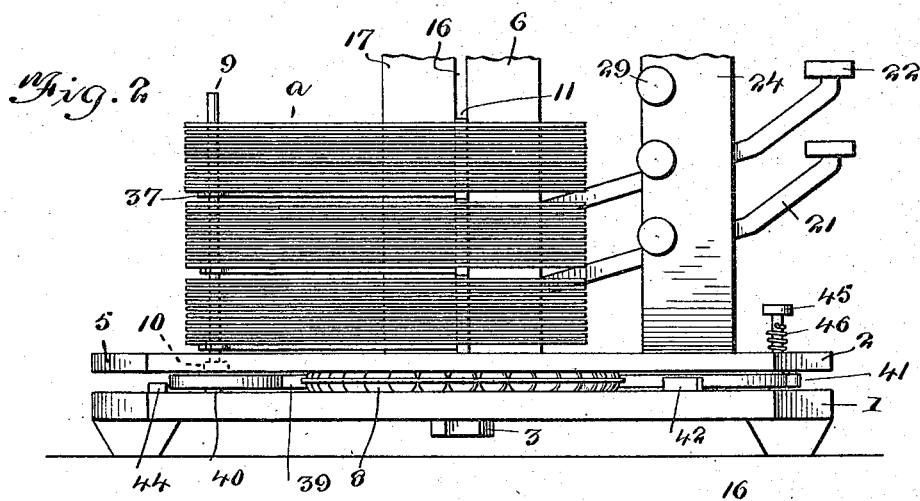
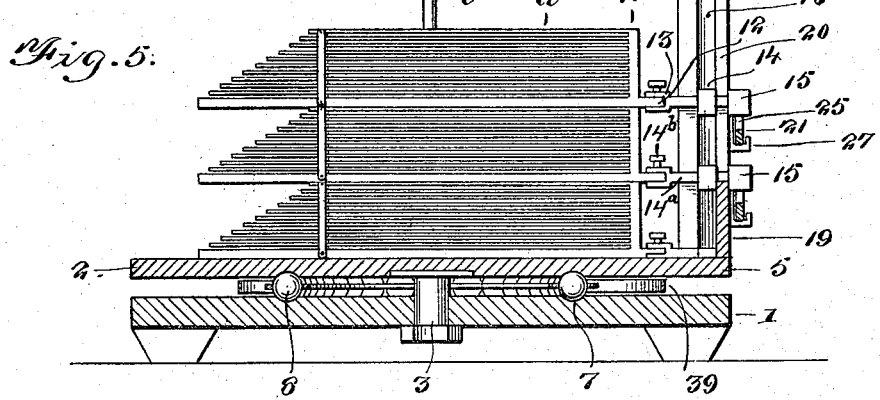
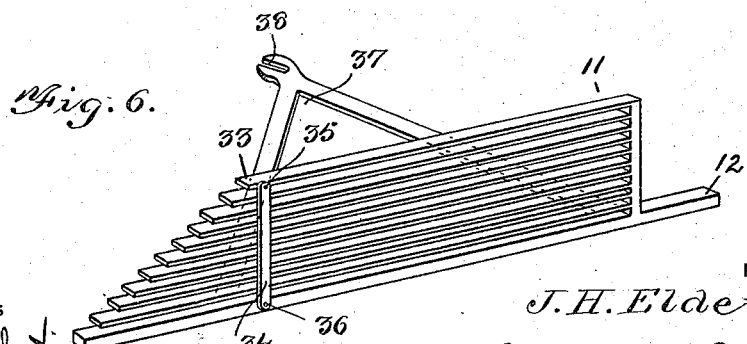
INVENTOR
J. H. Elder
BY Victor J. Evans
ATTORNEY
WITNESSES J. H. ELDER.
PRESCRIPTION FILING MACHINE.
APPLICATION FILED AUG. 7, 1917.
1,275,008.
Patented Aug. 6, 1918.
3 SHEETS—SHEET 3.
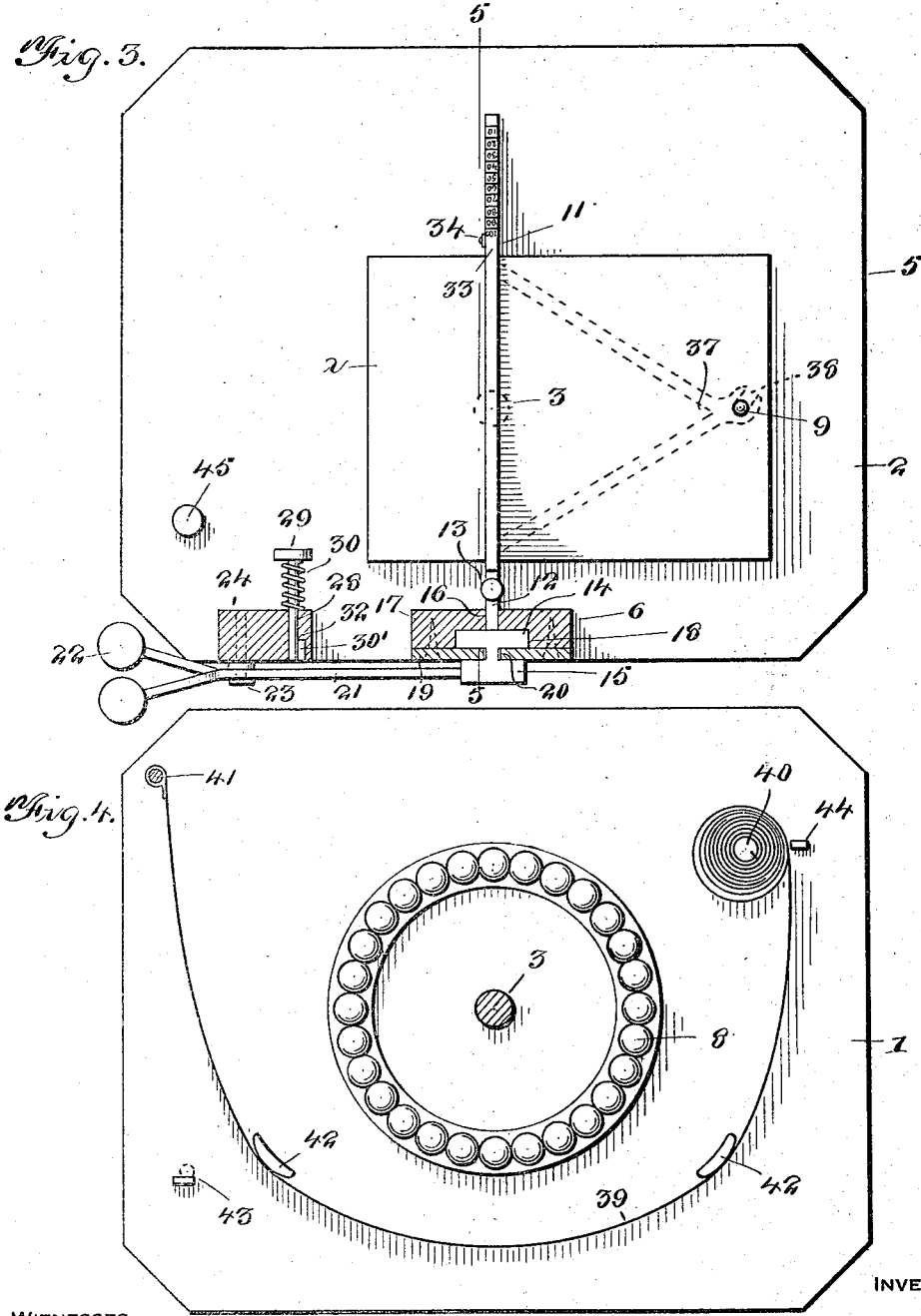

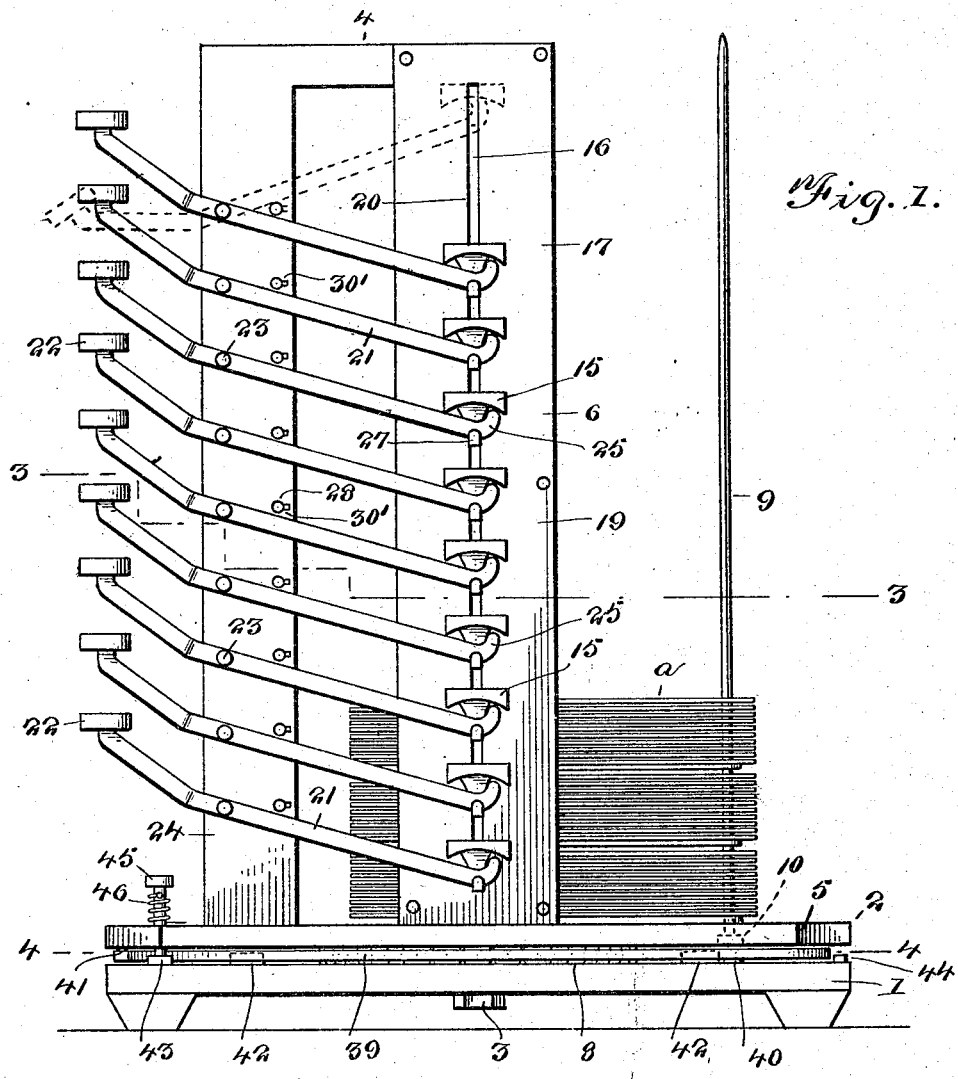
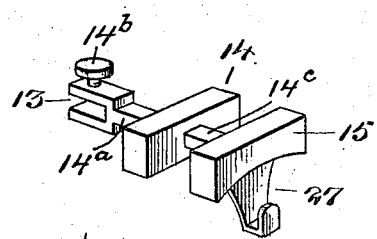

UNITED STATES PATENT OFFICE.

JOSEPH H. ELDER, OF AVERY, TEXAS.

PRESCRIPTION-FILING MACHINE.

1,275,008.  Specification of Letters Patent.  Patented Aug. 6, 1918.

Application filed August 7, 1917. Serial No. 184,929.

*To all whom it may concern:*

Be it known that I, JOSEPH H. ELDER, a citizen of the United States, residing at Avery, in the county of Red River and State of Texas, have invented new and useful Improvements in Prescription-Filing Machines, of which the following is a specification.

This invention is an improved filing machine especially adapted for use by druggists for filing prescriptions, the object of the invention being to provide an improved device of this character by means of which prescriptions and the like may be kept in numerical order in separate hundreds or other units and in tens or other fractional parts of the units and so that access can be instantly obtained to any desired numbered prescription to enable the same to be refilled and by means of which danger of incorrectly numbering prescriptions is minimized and the duplication of numbers on prescriptions is prevented and danger of loss of prescriptions from the file is also prevented or minimized.

The invention consists in the construction, combination and arrangement of devices hereinafter described and claimed.

In the accompanying drawings:—

Figure 1 is a front elevation of a filing machine constructed and arranged in accordance with my invention.

Fig. 2 is a rear elevation of the same.

Fig. 3 is a horizontal sectional view of the same on the plane indicated by the line 3—3 of Fig. 1.

Fig. 4 is a horizontal sectional view of the same taken on the plane indicated by the line 4—4 of Fig. 1, and showing the base in plan.

Fig. 5 is a vertical sectional view of the same.

Fig. 6 is a detailed perspective view of one of the clips.

Fig. 7 is a detailed perspective view of one of the cross heads.

In the embodiment of my invention I provide a base 1 on which the filing machine 2 is mounted for rotation, the pivot of the machine being indicated at 3 and arranged centrally thereof and also centrally of the base and said machine comprising a top 4, a bottom 5 and a front wall 6. The base and the bottom are provided in their opposing sides with circular ball races 7 in which are bearing balls 8, a ball bearing being thereby provided for the machine, to minimize friction and enable the machine to be readily turned on the base as desired.

A filing rod 9 has its lower end secured to the bottom of the machine as at 10. The prescriptions or other papers, indicated at $a$ are filed on the filing rod in numerical order and are divided in hundreds by clips 11 the capacity of each clip being one hundred prescriptions or other papers. Each clip has a lifting arm 12. A guide post 17 connects the top and bottom of the machine and is provided on its outer side with a cover plate 19. Cross heads 14 operate in the channel of the guide post and each cross head has an inwardly extending arm $14^a$ which is movable vertically in a slot 16 of the guide post, said arm $14^a$ having a slot 13 at its inner end to receive the lifting arm 12 of one of the clips and being also provided with a clamping screw $14^b$ whereby the clip may be detachably connected to the cross heads. Each cross head also has an outwardly extending arm $14^c$ which operates in a vertical slot 20 with which the cover plate 19 is provided. At the outer end of each arm $14^c$ is a lifting cam 15.

The clips may be lifted at will to enable access to be afforded to any clip desired. Ten of the clips are here shown but any suitable number may be employed according to the desired capacity of the filing machine and each clip may be of any desired capacity. Assuming the capacity of each clip to be one hundred prescriptions, those of the first hundred will be placed in the lowermost clip, those in the second hundred in the next lowermost and so on.

Associated with each clip is a lifting lever 21 each lifting lever being provided at its outer end with a key 22 which is numbered according to the numerical value of the clip with which it is associated, the lowermost lever key being numbered one hundred the next lowermost two hundred and so on, as will be understood. Each clip lifting lever is pivotally mounted as at 23 on a key post 24. The free inner end of each lifting lever is upturned as at 25 and is arranged to slide under the concave lower face of the lifting cam 15 of the cross head with which said lever is associated. Each cross head cam has a stop 27 extending downwardly therefrom and which limits downward movement of the lever 21, the said levers being slidable on said stops and said stops affording the required play of the levers to enable the latter to be employed to lift the clips as required.

Associated with each clip lifting lever is a lock pin 28 the lock pins being mounted for longitudinal movement and also for partial rotation in openings in the key post 24 and each lock pin being provided at its outer end with a push button 29 and also with a spring 30, said springs serving to normally push the lock pins outwardly so that their inner ends are out of the way of the lifting levers. Each lock pin is provided at its inner end with a shoulder 30' and when the lock pin has been pushed inwardly against the pressure of its spring 30 to arrange its inner end below the lever 21 with which said lock pin is associated and thereby cause the lock pin to engage the under side of said lever and lock the latter in clip lifting position, said lock pin must be partly turned so as to engage its shoulder 30' against the inner side of the key post and thereby hold the lock pin in locking position, against the tension of the spring 31. A recess 32 is also provided in the inner side of the key post for each lock pin, to receive the shoulder 30 of the latter when the lock pin is in normal, outwardly projected position.

Each clip is divided into ten superposed sections to receive prescriptions or other papers in tens by a series of spaced arms 33 which are of unequal length and are arranged in regular order according to their length, with the longest arm lowermost, so that the outer ends of all of the arms are exposed and the various tens into which the papers are divided by the said arms are designated, thus greatly facilitating access to the papers and enabling any desired numbered paper to be readily obtained. A gate 34 to hold the papers in the clip is pivotally connected at its upper end to the upper arm 33 as at 35 and is detachably connected to the bottom of the clip as at 36. Each clip has a horizontally arranged V-shaped arm or bracket 37 which forms the bottom thereof and which is provided with an open slot 38 to receive the filing rod 9. Any of the clips, after it has been disconnected from its arm 12, may be readily removed from the filing rod, with its papers intact and in place, as will be understood. The various tens indicated by the arms 33 are inscribed at the exposed ends of said arms as shown in Fig. 3.

To turn the machine through a half revolution when desired I provide a spring 39 which is coiled on a post 40 which rises from the base 1, the free end of the spring being attached to a pin 41 which extends downwardly from the bottom of the machine. The spring slidably engages on the outer sides of direction lugs 42 with which the base 1 is provided. The base also has stop lugs 43, 44. A stop pin or button 45 is mounted for vertical movement in the bottom 2 and is provided with a spring 46. This pin may be engaged with either of the stops 43, 44. When the machine is in normal position, with its front side outermost or foremost, the stop pin or button is engaged with the stop 43. When said button is disengaged from said stop the spring turns the machine through a half revolution and engages said pin with the stop 44, as will be understood.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. In a filing device of the class described, a filing rod, filing clips movable vertically on said filing rod and means to operate the clips.

2. In a device of the class described, a filing rod, filing clips movable vertically on the filing rod, and means for raising and lowering the clips, each clip being detachable from the filing rod and also from its raising and lowering means.

3. In a device of the class described, a filing rod, a guide post, clips arranged for vertical movement on the filing rod, heads arranged for vertical movement in the guide post and each connected to one of the clips, and key levers for raising and lowering the several heads together with the clips.

4. In a device of the class described, a filing clip having means to guide the papers thereon in tens.

5. In a device of the class described, a filing clip having means to guide the papers thereon in tens, and also having means to designate the several tens.

6. A filing machine, a base on which the machine is mounted for turning movement, a spring to turn the machine and means to hold the machine in position on the base.

7. In a device of the class described, a filing rod, a guide post, clips arranged for vertical movement on the filing rod and each having a head guided by the guide post, key levers engaging with the several heads and arranged to raise or lower the same together with the clip attached to each head, and means coacting with the key levers to secure the clips in raised position.

In testimony whereof I affix my signature.

JOSEPH H. ELDER.

Copies of this patent may be obtained for five cents each, by addressing the "Commissioner of Patents, Washington, D. C."